United States Patent
Lachat et al.

[11] Patent Number: 6,003,938
[45] Date of Patent: *Dec. 21, 1999

[54] SIDE IMPACT AIR BAG SEAT-INTEGRATED REACTION SURFACE PANEL

[75] Inventors: Michael J. Lachat, Macomb; Ronald A. Zimmerman, II, Rochester; Jeffrey A. Young, Eastpointe; Steven W. Maurer, Clinton Township; Michael A. Hague, Troy, all of Mich.

[73] Assignee: Breed Automotive Technology, Inc., Lakeland, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/647,100

[22] Filed: May 9, 1996

[51] Int. Cl.⁶ ..................................................... B60N 2/42
[52] U.S. Cl. .................................. 297/216.13; 280/730.2
[58] Field of Search ........................... 297/216.13, 216.1; 280/730.2, 730.1

[56] References Cited

U.S. PATENT DOCUMENTS

| | | | |
|---|---|---|---|
| 4,991,869 | 2/1991 | Hopf et al. | |
| 5,505,486 | 4/1996 | Ahn | 280/730.1 |
| 5,531,470 | 7/1996 | Townsend | 280/730.2 |
| 5,531,471 | 7/1996 | Terai | 280/730.1 X |
| 5,540,460 | 7/1996 | Wipasuramonton | 280/730.1 |
| 5,542,691 | 8/1996 | Marjanski et al. | 280/730.2 X |
| 5,542,696 | 8/1996 | Steffens, Jr., et al. | 280/730.1 X |
| 5,547,214 | 8/1996 | Zimmerman, II et al. | 280/730.2 X |
| 5,553,887 | 9/1996 | Karlow et al. | 280/730.2 |
| 5,556,127 | 9/1996 | Hurford et al. | 280/730.2 |
| 5,564,739 | 10/1996 | Davidson | 280/730.2 X |
| 5,586,782 | 12/1996 | Zimmerman, II et al. | 280/730.2 |
| 5,588,671 | 12/1996 | Boumarafi et al. | 280/730.2 |
| 5,605,346 | 2/1997 | Cheung et al. | 280/730.2 X |

FOREIGN PATENT DOCUMENTS

| | | |
|---|---|---|
| 296 01 257 U | 3/1996 | Germany . |
| 07215159 | 8/1995 | Japan . |
| 2 296 476 | 7/1996 | United Kingdom . |

*Primary Examiner*—Peter M. Cuomo
*Assistant Examiner*—Stephen Vu
*Attorney, Agent, or Firm*—Markell Seitzman

[57] ABSTRACT

A material cover (27) for a vehicle seat (22), the seat having a seat back (26) having a front surface (28), a rear surface (32) and a side surface (30), the material cover (27) including front (28'), rear (32') and side (30') material panels covering the front, rear and side of the seat back, a reinforcement panel (50,50') secured to an inside surface (31) of the side material (30') for effectively decreasing the elongation of the side panel (30') to localize stress in the side material portion (30') to encourage the side material portion to tear along a line proximate a side (52a) of the reinforcement panel when the panel is forced outwardly by the action of an inflating air bag (46).

22 Claims, 3 Drawing Sheets

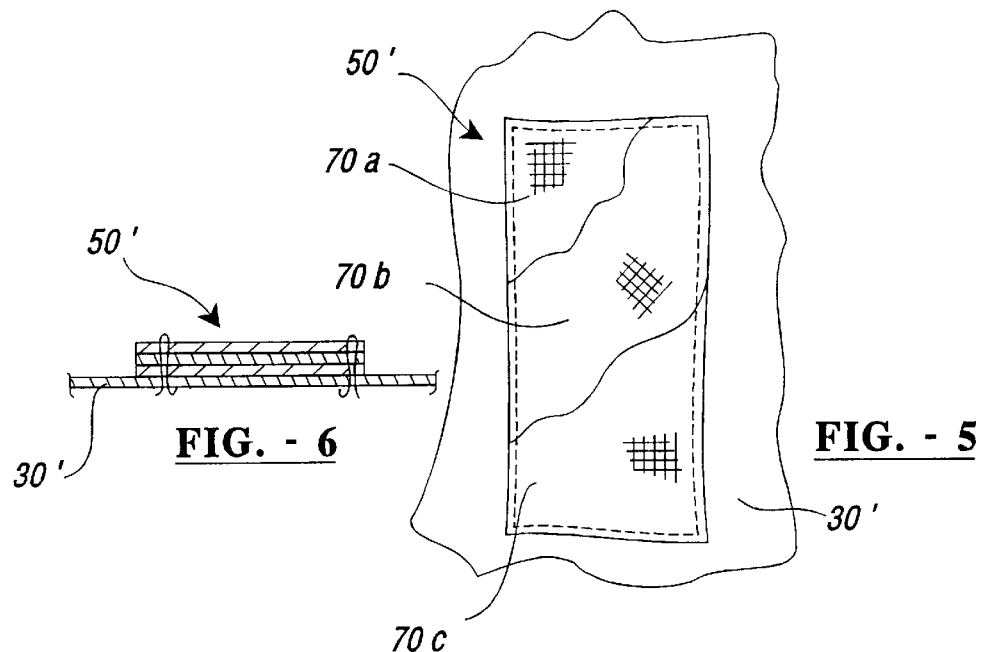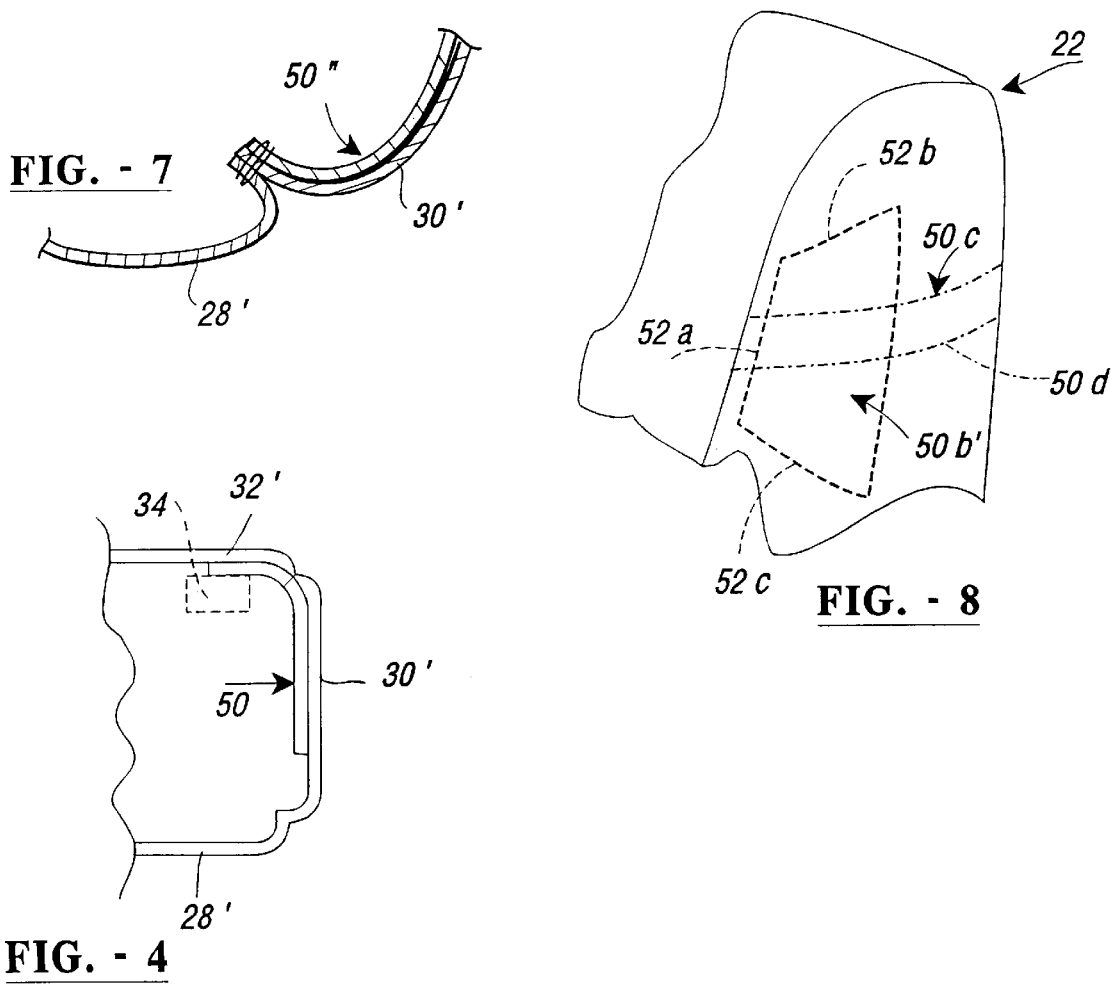

SIDE IMPACT AIR BAG SEAT-INTEGRATED REACTION SURFACE PANEL

BACKGROUND AND SUMMARY OF THE INVENTION

The present invention generally relates to side impact air bag systems and more particularly to an apparatus that may be integrated within the covering material of an automotive seat to controllably open a portion thereof upon deployment of an air bag.

Currently side impact air bag systems are either mounted within the vehicle door or integrated within the front driver or passenger automotive seat. FIG. 1 is illustrative of a typical side impact system mounted to a vehicle seat 22. The seat comprises a seating portion 24 and seat back 26 includes a front surface 28, a side 30 and a rear surface 32 and one or more structural components 34 generally shown as a reinforcing bar used to support seat back 26. A fabric, vinyl or leather seat cover 27 is fitted about a formed pad or foam cushion 35. The seat cover 27 includes a front 28', side 30' and rear 32' fabric cover portions or panels fitted over the foam 35. An air bag module generally shown as 40 is fitted within a recess within the padding or foam 35 in the side 30 of the seat back 26. The air bag module 40 typically comprises an inflator, housing, air bag and hinged deployment door or trim cover 42. When the air bag opens it presses on the hinged door 42, hinged along its rear side, opening same permitting the air bag to inflate between the vehicle side and the adjacent side of the occupant to be protected. These doors are typically fitted about the outside of the fabric cover 27 and may be supported by the structural member 34. The externally mounted door or trim cover requires an opening in the seat cover side panel 30'. This opening often adversely impacts the fit and finish of the side panel 28' since this opening makes it difficult to achieve the desired tension (smoothness) in the seat cover (trim) fabric. This type of construction is inefficient and raises the cost of the overall seat and air bag system and also requires the precise alignment between the trajectory of the inflating air bag and the position of the door 42 and location of the opening in the side panel which may be difficult to achieve. Another major problem with a rigidly mounted deployment door arises from the fact that the outline of the finished, sewn side panel 30' and its orientation relative to the padding is not the same for all seats within a car line. This outline can vary up to 20 mm since the locations of the various seams 44a,b,c of the cover 27 are not controlled to a high degree. Consequently, the location of the opening in the side panel will vary from car to car. The result of this is that the air bag module manufacturer probably would either have to make some type of compensating feature to adjust for the different seat trim outlines or make a number of modules that would be matched to the seat trim outline at the time of assembly to provide an acceptable fit and finish. This of course further increases the price of the system. Further, since the door is exposed it may be damaged by the occupant and may fatigue after a number of occupant ingress/egress cycles, or physically deteriorate as it is exposed to the sun, dirt, water, etc. This type of cover, which is a rigid body may also create an occupant discomfort factor as it may reduce the overall compliance (softness) of the cushioned seat.

As is known in the art, the various parts of the automotive seat are sewn together along various seams such as 44a,b,c. One suggestion is to eliminate the use of a separate, exterior door and rely upon the inflating air bag to rip the forward seam, such as 44a, to provide an egress opening through which the side impact air bag expands as it continues to inflate. While this proposal has merit, it provides a contradiction that can be seen below. To ensure that the air bag is consistently deployed, the front seam 44a needs to be sufficiently weak to enable the air bag to rip it open in a predictable manner. Alternatively, the size of the inflator could be increased to compensate for the increased seam strength insuring that the seam is properly ripped. This in turn requires a stronger mounting bracket, housing, bag, etc. However, utilizing a weak seam may, over the 10 to 15 year useful life of the vehicle, cause a degradation in the strength of the seat cover 27. If the seam is reinforced to insure it does not come apart due to normal wear, the air bag will not be able to rip the seam open and must then rip or tear through the side covering panel material 30'. As there are lot-to-lot differences between seemingly identical woven, knitted, vinyl or laminated fabrics or natural covering material such as leather and certain cloths it becomes difficult to predict just where the side panel 30' will rip. Consequently, the ability of the air bag to cleanly and consistently rip through the covering material will vary from lot to lot. As can be appreciated, the consistency of air bag deployment will be affected by any variability in the construction of the seams and the consistency in the threads used.

We have found that one major contributor to the variability in the performance of side impact air bag systems is the elongation, or variation in elongation, of the material used as the cover. The present invention has demonstrated the ability to overcome this variability to achieve consistent and repeatable performance through a $-40°$ C. to $+85°$ C. temperature range.

It is an object of the present invention to provide a side impact deployment mechanism that solves the deficiencies in the prior art. A further object of the present invention is to provide a side impact mechanism that is invisible and one that does not detract from the aesthetics and comfort of the automotive seat. A further object of the present invention is to provide a reaction surface or reinforcement panel mechanism that protects an adjacent air bag from occupant tampering and subsequent damage.

Accordingly the present invention comprises: a material cover for a vehicle seat, the seat having a seat back cushion having a front surface, a rear surface and a side surface covered by a material cover. The vehicle seat may be any seat within the vehicle. The material cover includes a front panel, rear panel and side panel covering the front, rear and side of the seat back. In one of its preferred embodiments the invention further includes first means secured to an inside surface of the side panel of the seat cover for effectively decreasing the elongation of the side panel, for localizing stress in the side panel and encouraging the side panel to tear along a determinable tear line generally proximate a side of the first means as the first means is forced outwardly by the action of an inflating air bag. In one embodiment of the invention the first means includes a thin, flexible reinforcement panel sewn to the inside of the side panel and in another embodiment the reinforcement panel is formed from a layered construction of a plurality of thin, lightweight pieces of fabric. In another embodiment of the invention the side panel of the cover itself is made of a low elongation material.

Many other objects and purposes of the invention will be clear from the following detailed description of the drawings.

BRIEF DESCRIPTION OF THE DRAWINGS

In the drawings:

FIG. 4 illustrates another version of the invention.

FIGS. 5 and 6 illustrate a further embodiment of the invention.

FIG. 7 illustrates another embodiment of the invention.

FIG. 8 is a further embodiment of the invention.

DETAILED DESCRIPTION OF THE DRAWINGS

Figure 1:
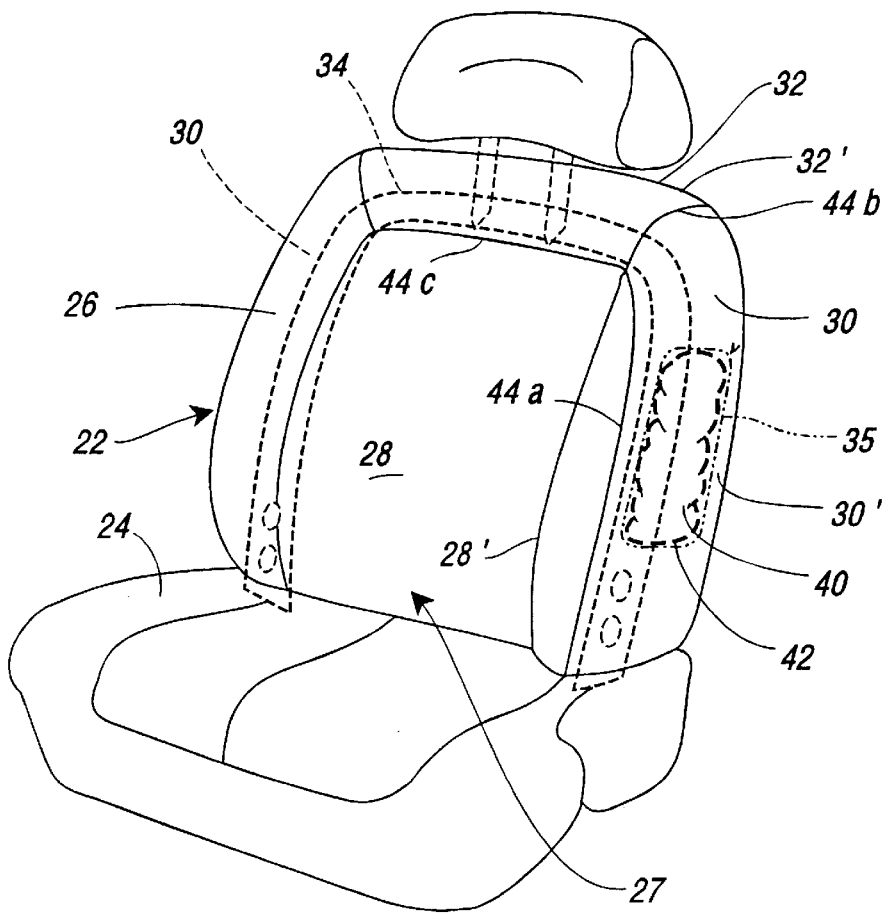
FIG. 1 is illustrative of the prior art.
Figure 2:
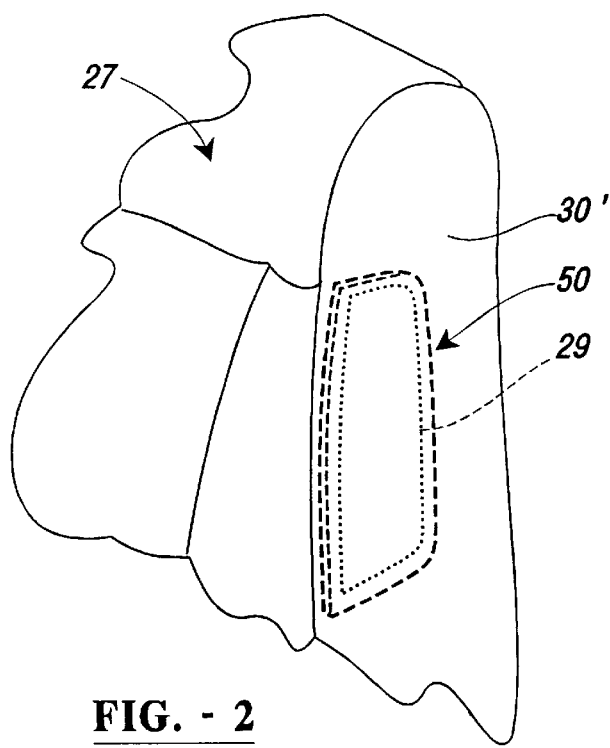
FIGS. 2 and 3 illustrate a first embodiment of the invention.
Figure 3:
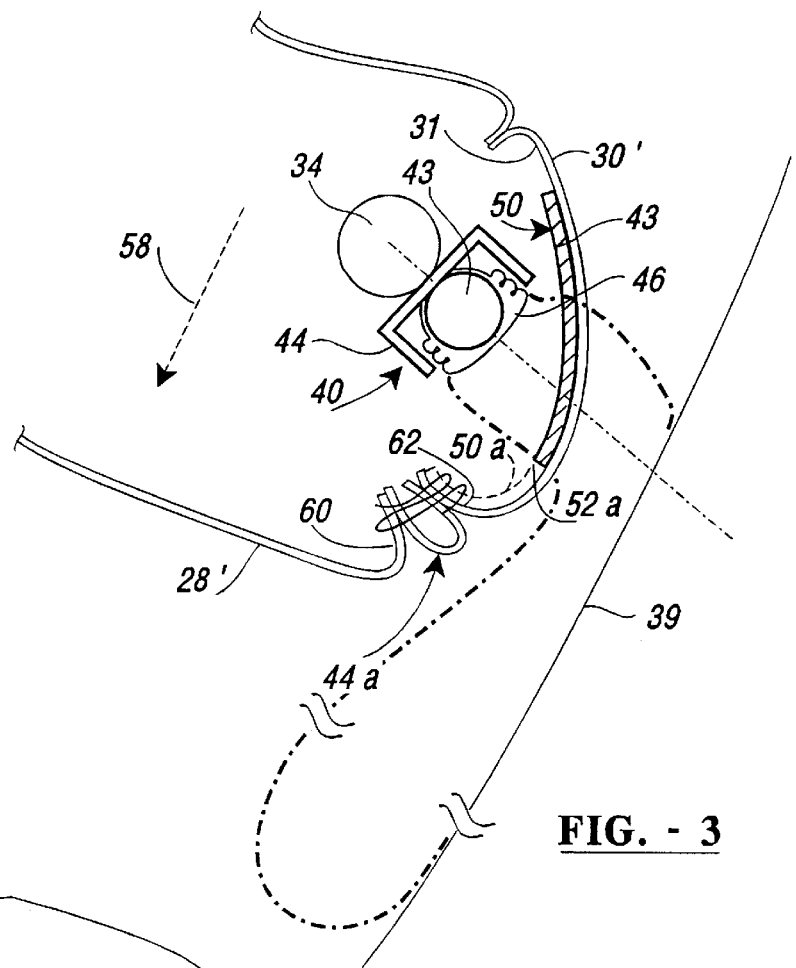

Reference is made to FIGS. 2 and 3 which show the major components of the present invention. The present invention comprises a means for locally increasing the stiffness of all or a portion of the side panel material or fabric covering 30' of a seat cover 27 and in so doing reducing the variability in air bag deployment arising from the elongation of the panel. In a first embodiment of the invention a generally rectangular reinforcement panel 50, defining a reaction surface, having a lower elongation characteristic than that of the fabric in the seat side panel 30' is secured to the side panel 30'. Test data has shown that some seat cover material can elongate as much as 50%. The panel 50 material can be a semi-rigid material such as thin plastic (nylon) film or a polypropylene sheet, having a thickness of 1–1.5 mm or may be a thin metal plate. The panel is secured to the adjacent seat panel 30' in a manner that the side panel does not slip, slide or elongate over the reinforcement panel 50. If appropriate, the panel 50 could be heat welded to the side panel 30' or sewn to the inside 31 of the side panel 30'. If a sew seam 29 is used it can extend about the top, bottom and rear sides or four of the panel sides 52a–d. As the sides 30 of many seats are not flat, the panel 50 may be pre-formed to conform to the contour of the side 30 of the seat 22 to provide a covering of the under padding 35 and to permit the side panel 30' to lay flat on the reaction surface or reinforcement panel 50. In another embodiment (see FIG. 4) the panel 50 extends rearward around to the rear panel 32' of the covering material 27 on the back of the seat and is sewn thereto and/or may have its rear side 50d secured to a structural member 34 of the seat.

The air bag module 40 comprising an inflator 43, a housing 44 and a folded air bag 46 is secured in a known manner to the seat support 34 and will typically be located in an opening or recess of the seat's padding 35. The center of the air bag module may be aligned such that on inflation a greater portion of the inflating air bag impinges on the panel 50 between its central vertical axis and the forward edge 52a. This arrangement may be accomplished by orienting the module 40 aligned along an axis 56 that is oriented at an angle A, preferably between 15 and 70 degrees from the longitudinal axis 58 of the vehicle. In this manner the inflating air bag 46 (shown in phantom line) has a forward component of force against the panel 50 directed toward the forward edge 52a of the panel and a perpendicular outwardly directed component. As the air bag continues to inflate forces tend to build up along the forward side 52a of the panel 50, locally stressing the side panel 30', causing the side panel 30' to break open and permit the air bag to continue to inflate and be positioned between the occupant's head and torso and the vehicle side 39 to protect the occupant.

Figure 9:
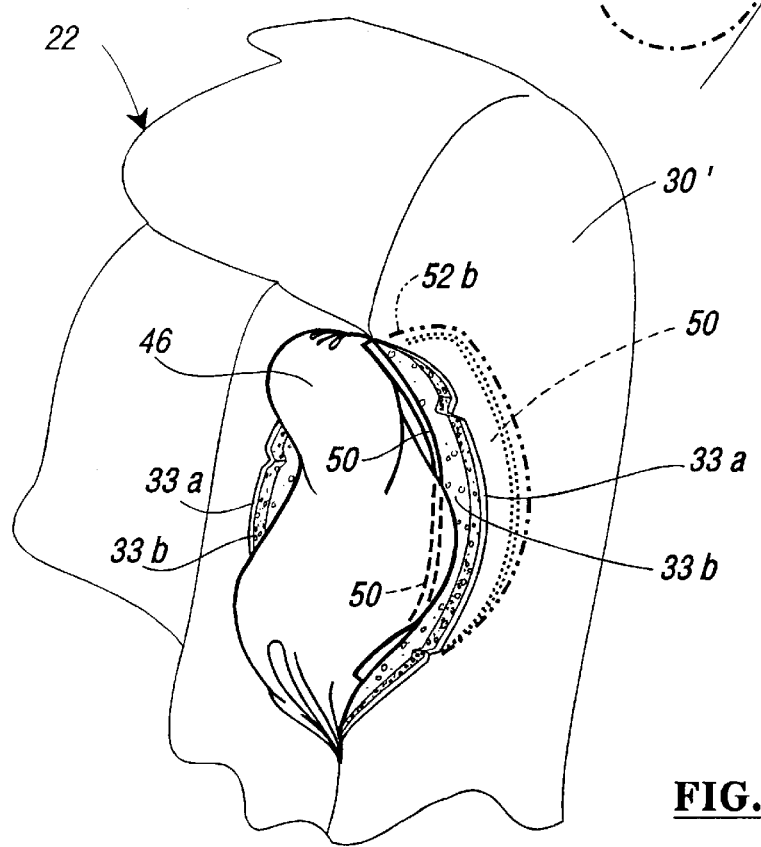
FIG. 9 shows an air bag exiting from a vehicle seat.

Reference is briefly made to FIG. 3 which also shows the typical construction of a seam such as 44a. The edges 60 of the front panel of material 28' and edge 62 of the side panel of material 30' are sewn together with a welting 64 therebetween. As is known in the art, the welting is optional. With the reaction surface panel 50 in the position as shown in FIG. 3 the side panel 30' of fabric has shown that it will generally tear along or parallel to the forward side 52a and may also propagate along or adjacent the top and bottom sides 52b and c of the panel 50. If the seat cover 27 initially opens along the seam 44a the tear will continue to propagate generally along the or near the seam. As can be appreciated, the actual tear line through the side panel 30' can be moved closer to the seam 44a as the panel 50 is moved closer to this seam 44a. The panel can be sewn directly into the seam 44a (see the panel extension 50a of FIG. 3), rather than being spaced therefrom, permitting the forces to be localized at the seam. Reference is briefly made to FIG. 9 which shows an air bag 46 exiting from an opening created as the reinforcement panel 50 rips the cover side panel 30' slightly in front of the forward edge of the reinforcement panel 50. As the rip propagates it will extend along the seam 44a and/or about the upper and lower sides of the reinforcement panel 50. In FIG. 9 the side panel 30' is shown as a conventionally used, multi-layered material having an outer layer 33a and an inner foam layer 33b.

As can be appreciated, the use of the above described panel (typically a plastic panel) will not markedly detract from the desired cushioned, flexibility of the upholstered side 30 of the seat 22 as this panel is able to flex. The reinforcement panel 50 is invisible to the occupant and protects the air bag from being tampered with providing a protective covering about the air bag and inflator.

Reference is made to FIGS. 5 and 6 which illustrate an alternate construction of a panel 50' which also provides for the localized stiffening of the side panel 30' of the seat cover fabric. The panel 50' comprises at least one panel of low elongation fabric 70a secured to the seat cover side panel 30'. This fabric can be a high denier material or even a length of seat belt material (shown as phantom line 50d, as a thin horizontally positioned, panel 50c in FIG. 8) and sewn to the side panel 30' which typically has an elongation of between 8 to 16 percent. The use of a low elongation reinforcement panel 50' will insure that the seam 44a or panel 30' material adjacent the reinforcement panel 50' is properly stressed to its break strength. While a single, homogeneous panel can be used a low elongation panel can be constructed of a plurality of overlaying, thin, lightweight panels of material 70a–70c. The overlaying panels of material may be constructed of thin, flexible, woven fabric typically used to construct an air bag. For example, this material may be 315, 430, 630 or 840 denier woven, coated or uncoated fabric, typically nylon or polyester air bag fabric. The overlaying panels can also be constructed using non-woven polyester sheets or a combination of woven and non-woven material.

As can be seen, one embodiment of a reinforcement panel 50' comprises three layered pieces of woven material 70a–70c. The first panel 70a is arranged such that its weft fibers and warp fibers run horizontally and vertically oriented.

The same is true for the orientation of the fibers for panel 70c. The middle fabric is arranged such that its weft and warp fibers lie at a 45 degree bias to panels 70a and 70c. The three panels are sewn together about their common periphery. Thereafter, the panel 50'' is sewn to the material 30' in a location that will be generally opposite the location of the inflating air bag 46. The orientation of the various fibers of the individual pieces of fabric 70a–c define a reinforcement panel 50' that displays a relatively low elongation compared to the elongation of typical materials used in seat covers or in the sew seam threads of these covers 27. The interaction of panel 50' with the side cover material 30' is substantially identical to that described above.

It should also be appreciated that the entire side panel 30' of the cover 27 can be reinforced by a stiffening panel such as panels 50 or 50' which is of the same size and shape as the side covering 30'. In this case the reinforcement panel is secured to the side panel prior to the side panel being sewn to the other panels of the seat cover 27. As can be appreciated it is not necessary to "reinforce" the side panel 30' of the seat cover 27 if the side panel 30' itself is made from a low elongation material sufficient to concentrate the energy of the inflating bag into and tear the forward seam 44a of the seat.

Reference is briefly made to FIG. 7 which shows that the flexible reinforcement panel 50" can be sewn into the edge portion of the side panel 30' such that the panel 50" becomes part of the seam 44a. In this embodiment the side material 30' will open as the seam 44a is torn.

FIG. 8 shows a further embodiment of the invention using a panel 50b having a shortened leading side 52a. As illustrated the front of the panel 50b is generally trapazoidally shaped. The panel can be secured to the seat cover side panel 30', attached to the rear panel 32' or attached to the seat structure 34. As can be appreciated the shortened side 52a acts as a further stress concentrator to more easily rip through the side panel 30' material. This trapazoidally shaped or pointed panel 50b can be constructed in the manner of any of the panels 50, 50', 50a, 50c. The covering fabric 30' or seam 44a will begin to tear in the vicinity of side 52a and extend about top and bottom sides 52b and c.

Many changes and modifications in the above described embodiment of the invention can, of course, be carried out without departing from the scope thereof. Accordingly, that scope is intended to be limited only by the scope of the appended claims.

We claim:

1. A material cover (27) adapted to cover a vehicle seat (22) having a seat back (26) with a front surface (28), a rear surface (32) and a side surface (30), comprising:
    one or more panels for covering the seat back wherein said at least one panel including a side panel (30') adapted to cover the side surface of the seat, the side panel having a predetermined rate of elongation; and
    first means (50,50') for effectively decreasing the elongation of the side panel (30') to localize stress in the side panel (30') to encourage the side panel to tear along a generally predetermined line in response to the inflating air bag (46), wherein the first means includes a flexible, multi-sided reinforcement panel (50) secured on an inside of the side panel (30').

2. The material cover as defined in claim 1, wherein the first means includes a plurality of thin, lightweight, flexible pieces of material (70a–c) joined together as a reinforcing panel having an elongation less than the elongation of the side panel of the seat cover.

3. The material cover as defined in claim 1, wherein the first means comprises a reinforcing panel (50") having a narrowed front edge (52a).

4. The material cover as defined in claim 3, wherein the reinforcing panel is coextensive with the side panel (32').

5. The material cover as defined in claim 1 wherein the side panel (30') has an elongation that is lower than an elongation of an adjacent portion of the cover material panels.

6. The material cover as defined in claim 1, wherein the air bag impinges on the first means with a forward component of force and a perpendicular component to open a forward side of the first means.

7. The material cover as defined in claim 1, wherein the elongation of the first means is less than 16%.

8. The material cover as defined in claim 1, wherein the elongation of the first means is less than or equal to an elongation from one of the group of materials consisting a nylon film, a polypropylene, and a seat belt webbing.

9. A vehicle seat (22) comprising a seat back (26) having a front surface (28), a rear surface (32) and a side surface (30);
    a material cover (27) covering the front (28) surface and the surface (32) and side (30) of the seat back, the cover including a side panel (30') covering the side surface;
    first means (50,50') for effectively decreasing an elongation of the side panel (30') to localize stress in the side panel (30') to encourage the side panel to tear along a generally predetermined line in response to an inflating air bag (46), wherein the first means includes a flexible, multi-sided reinforcement panel (50) secured on an inside of the side panel (30'); and
    the air bag located proximate the side surface and inflated by an inflator.

10. The seat as defined in claim 9, wherein the first means includes a plurality of thin, lightweight, flexible pieces of material (70a–c) joined together as a reinforcing panel having an elongation less than the elongation of the side panel of the seat cover.

11. The seat as defined in claim 9, wherein the side panel (30') has an elongation that is lower than an elongation of an adjacent portion of the cover material panels.

12. The seat as defined in claim 9, wherein the air bag impinges on the first means with a forward component of force and a perpendicular component to open a forward side of the first means.

13. The seat as defined in claim 9, wherein the first means comprises a panel (50") with a narrowed front edge (52a).

14. The seat as defined in claim 13, wherein the reinforcing panel is coextensive with the side panel (32').

15. A vehicle seat (22) comprising a seat back (26) having a front surface (28), a rear surface (32), and a side surface (30);
    a material cover (27) covers the front surface (28), the rear surface (32), and the side surface (30) of the seat back, wherein the cover includes a side panel (30');
    an air bag and inflator located within the seat back, below the side panel of the material cover; and
    first means (50,50') secured to an interior portion of the side panel of the material cover for providing a semi-rigid protection about the air bag and for effectively controlling an elongation of the side panel (30') to encourage the side panel to tear along a generally predetermined line in response to an inflating air bag (46), wherein the first means includes a flexible, multi-sided reinforcement panel (50) secured on an inside of the side panel (30').

16. The seat as defined in claim 15, wherein the first means comprises a reinforcing panel (50") with a narrowed front edge (52a).

17. The seat as defined in claim 16, wherein the reinforcing panel is coextensive with the side panel (32').

18. The seat as defined in claim 15, wherein the side panel (30') has an elongation that is lower than an elongation of an adjacent portion of the cover material.

19. The seat as defined in claim 15, wherein the air bag impinges on the first means with a forward component of force and a perpendicular component to open a forward side of the first means.

20. An improved material cover (27) for a vehicle seat (22) including a seat back (26) having a front (28), a rear (32) and a side (30), comprising:

a side panel joined to another panel at a tearable seam, the side panel providing a covering for at least a portion of the side of the seat back, the side panel having a predetermined rate of elongation and when stressed by an inflating air bag, said side panel would stretch relative to the seam; and first means (50,50') secured at a first location proximate the seam to a portion of the side panel and also secured at another location remote from the seam for limiting the extension of the side panel and for localizing any increases in stress resultant upon the inflation of the air bag, at or proximate the seam near the first location to encourage one of the side panel and seam to tear generally along the seam or adjacent thereto in response to an inflating air bag (46).

21. A vehicle seat (22) comprising a seat back (26) having a front surface (28), a rear surface (32) and a side surface (30);

the material cover (27) covering the front surface (28), the surface rear (32) and the side surface (30) of the seat back, wherein the cover includes a side panel (30) joined to at least a front panel at a tearable sewn seam;

first means (50,50') for effectively decreasing an elongation of the side panel (30') to localize stress in the side panel (30') to encourage the side panel to tear proximate the seam along a generally predetermined manner in response to an inflating air bag (46); and the air bag located proximate the side surface and inflated by an inflator.

22. A vehicle seat (22) comprising a seat back (26) having a front surface (28), a rear surface (32) and a side surface (30);

a material cover (27) covering the front surface (28), the rear surface (32) and the side surface (30) of the seat back including a side panel (30) joined to another panel at a sewn seam;

an air bag located proximate the side surface of the seat back and an inflator for providing gas to inflate the air bag, the air bag and inflator located below the side panel of the material cover within the seat back; and first means (50,50') secured to an interior portion of the side panel for providing at least a semi-rigid protective hood apart from the air bag, the hood secured proximate to the seam and for limiting the elongation of the side panel (30') in response to the inflating air bag and for encouraging the side panel to tear proximate to the seam.

* * * * *